United States Patent
Yamamoto et al.

(10) Patent No.: US 7,528,975 B2
(45) Date of Patent: May 5, 2009

(54) SLIP PRINTING SYSTEM

(75) Inventors: Tsuyoshi Yamamoto, Nagoya (JP); Eiichi Ito, Kasugai (JP); Takaaki Kato, Nagoya (JP); Takashi Morita, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 833 days.

(21) Appl. No.: 10/810,559

(22) Filed: Mar. 29, 2004

(65) Prior Publication Data

US 2004/0246522 A1 Dec. 9, 2004

(30) Foreign Application Priority Data

Mar. 28, 2003 (JP) ............................. 2003-089778

(51) Int. Cl.
*G06F 15/00* (2006.01)
*H04W 24/00* (2006.01)
(52) U.S. Cl. ...................... 358/1.15; 455/457
(58) Field of Classification Search ................ 358/1.15, 358/1.16, 1.11, 402; 709/203, 208, 217–219, 709/223, 227, 229; 455/41.3, 426.1, 426.2, 455/419, 420, 466, 556.2, 70; 379/100.02, 379/100.08, 142.6; 705/27, 40
See application file for complete search history.

(56) References Cited

U.S. PATENT DOCUMENTS

| | | | |
|---|---|---|---|
| 2002/0026413 A1 | 2/2002 | Wu | |
| 2002/0054345 A1* | 5/2002 | Tomida et al. | 358/1.15 |
| 2002/0184302 A1 | 12/2002 | Prueitt et al. | |
| 2003/0069038 A1* | 4/2003 | Takamine et al. | 455/556 |
| 2003/0078895 A1* | 4/2003 | MacKay | 705/64 |
| 2003/0179405 A1* | 9/2003 | Seto | 358/1.15 |
| 2004/0185914 A1* | 9/2004 | Ohmura et al. | 455/566 |
| 2004/0203909 A1* | 10/2004 | Koster | 455/456.1 |

FOREIGN PATENT DOCUMENTS

| | | |
|---|---|---|
| JP | A 2001-273559 | 10/2001 |
| JP | A 2002-133347 | 5/2002 |
| JP | A 2002-259608 | 9/2002 |

* cited by examiner

*Primary Examiner*—Saeid Ebrahimi Dehkordy
(74) *Attorney, Agent, or Firm*—Oliff & Berridge, PLC (57) ABSTRACT

A slip printing system which can be employed in a service management system is configured to include a host computer, a mobile terminal device, and a mobile printer that is capable of receiving data from the mobile terminal device. The mobile terminal device includes a service information input module. The service information input through the service information input module is transmitted to the host computer. A print data generating module of the host computer generates print data to in accordance with the service information. The print data generated by the print data generating module is transmitted to the mobile terminal device. The mobile terminal device transmits the print data which has been transmitted from the host computer, and the mobile printer prints an image on a slip in accordance with the print data transmitted from the mobile terminal device.

29 Claims, 8 Drawing Sheets

AAA STORE SALES MENU
CUSTOMER No. [       ]

ITEM : UNIT PRICE : QUANTITY

CABBAGE     : ¥100 : [     ]
CARROT      : ¥50  : [     ]
GREEN ONION : ¥10  : [     ]
TOMATO      : ¥30  : [     ]

FIG.5B

AAA STORE SALES MENU
CUSTOMER No. [ 123456 ]

ITEM : UNIT PRICE : QUANTITY

CABBAGE     : ¥100 : [ 3 ]
CARROT      : ¥50  : [ 5 ]
GREEN ONION : ¥10  : [ 2 ]
TOMATO      : ¥30  : [ 5 ]

FIG.5C

AAA STORE SALES MENU
CUSTOMER: HANAKO HORITA

ITEM : UNIT PRICE : QUANTITY

CABBAGE     : ¥100 : 3
CARROT      : ¥50  : 5
GREEN ONION : ¥10  : 2
TOMATO      : ¥30  : 5

TOTAL : ¥720

TO ISSUE SLIP [ OK? ]

FIG.6A

DELIVERLY SLIP

Ms.H.HORITA

```
ITEM    : UNIT PRICE : QUANTITY
CABBAGE :    ¥100    :    3
CARROT  :    ¥50     :    5
GREEN ONION : ¥10    :    2
TOMATO  :    ¥30     :    5
```

TOTAL : ¥720

WE HAVE DELIVERED ABOVE ITEMS
WE WILL BILL YOU LATER

APRIL **,2004
AAA STORE
SEAL

FIG.6B

DELIVERLY RECEIPT

ATTN. AAAA STORE

```
ITEM    : UNIT PRICE : QUANTITY
CABBAGE :    ¥100    :    3
CARROT  :    ¥50     :    5
GREEN ONION : ¥10    :    2
TOMATO  :    ¥30     :    5
```

TOTAL : ¥720

I RECEIVED ABOVE ITEMS
I WILL PAY THE ABOVE AMOUNT LATER

MARCH 30, 2004

CUSTOMER'S SIGNATURE

FIG. 7

BILLING RECEIPT

Ms.HANAKO HORITA

| ITEM | UNIT PRICE | QUANTITY |
|---|---|---|
| CABBAGE | ¥100 | 3 |
| CARROT | ¥50 | 5 |
| GREEN ONION | ¥10 | 2 |
| TOMATO | ¥30 | 5 |

TOTAL : ¥720

WE HAVE RECEIVED THE ABOVE AMOUNT

MARCH 30, 2004
AAAA STORE
SEAL

SLIP PRINTING SYSTEM

BACKGROUND OF THE INVENTION

The present invention relates to a slip printing system, which is employed, for example, in a mobile order receiving/placing system for receiving/placing orders in door-to-door sales.

At the scene of the door-to-door sales, when a sales person receives an order, an order receiving slip, on which details of the order are written, is typically given to the customer. Generally, such a slip is a predetermined form, on which the sales person writes the items ordered by a customer, unit prices and quantities thereof are written by hand. Further, the sales person calculates a total price by adding prices of the ordered items, each of which is calculated by multiplying the unit price by the quantity of the item. Typically, such a calculation is performed using a hand-held calculator, and all the information is written on the slip by hand.

When the sales person hands the order receiving slip to the customer, the order is confirmed between the sales person and the customer. However, in order that the orders is actually placed, the order collected by sales person should be input in a spreadsheet or a data base on a computer system, and centrally managed. Therefore, in a conventional order receiving/placing system, the sales person is required to input the information same as the information written on the order receiving slip after returning his/her office.

Generally, there are a plurality of sales person, and each sales person receives orders from a plurality of customers. In such a system, a large amount of manual procedures of the sales persons are required, and the data flow is inefficient since the same information is once written by hand and then input in the computer system. Further, in such a system, human errors may likely occur. Furthermore, until all the sales persons input the data for all the customers, an entire ordered status is unknown and the order will not be placed. That is, when each sales person receives the order from the customer, it is impossible to know, for example, the stock status of the ordered item.

SUMMARY OF THE INVENTION

The present invention is advantageous in that, with use of the slip printing system, an improved mobile order receiving/placing system can be realized, in which the load to each sales person is significantly reduced, and further, the efficiency of the data flow is well improved.

According to an aspect of the invention, there is provided a slip printing system which can be employed in a service management system. The slip printing system includes a host computer that stores data related to a service managed by the service management system, a mobile terminal device having that is capable of performing data communication with the host computer, and a mobile printer that is capable of receiving data from the mobile terminal device and printing an image in accordance with the data received from the mobile terminal device.

The mobile terminal device includes a service information input module through which service information regarding a service a customer intends to receive is input, the service information input through the service information input module being transmitted from the mobile terminal device to the host computer. The host computer includes a print data generating module that generates print data to be printed by the printer in accordance with the service information transmitted from the mobile terminal device, the print data generated by the print data generating module being transmitted to the mobile terminal device. The mobile terminal device transmits the print data which has been transmitted from the host computer, and the mobile printer prints an image on a slip in accordance with the print data transmitted from the mobile terminal device.

In a particular case, the service the customer wants to receive allows the customer to buy items, and the service information includes information indicating items the customer intends to buy and quantities thereof.

In this case, the mobile terminal device may include a display, and available items may be displayed on the display in order to allow the customer to select desired items from among the displayed ones.

Optionally, the service information may include information regarding a payment method for the items the customer intends to buy.

Further optionally, the host computer may be configured to store stock status of available items and unit prices thereof. Optionally, the mobile terminal device may be configured to store at least part of the stock status of available items and unit prices thereof.

Further, at least part of the stock status of available items and unit prices thereof stored in the mobile terminal device may be updated in accordance with data transmitted from the host computer.

In a particular case, the service information transmitted from the mobile terminal device to the host computer may include customer identification data, and the print data generating module may be configured to insert a customer's name in the print data. In this case, the customer's name is retrieved based on the customer identification data transmitted.

Optionally, the service information may include data indicating a method of payment for the service rendered.

In a particular example, the print data generating module may be configured to generate different print data depending on the payment method.

Specifically, when the payment method is to pay in cash, the print data generating module may generate the print data for printing a billing receipt. When the payment method is to pay later, the print data generating module may generate the print data for printing a delivery slip and a delivery receipt.

Optionally, the host computer may be configured to store customer information, which is updated based on the service information transmitted from the mobile terminal device.

Still optionally, the mobile terminal device may include a display, and available service items which can be selected by a customer are displayed on the display in order to allow the customer to select desired service items from among the displayed ones.

Optionally, the print data generating module may be configured to generate the print data having a format that corresponds to the service item selected by the customer.

In a particular case, the print data represents a slip regarding a payment for the service item selected by the customer.

Optionally, the mobile terminal device may include a display on which preview image is displayed based on the print data transmitted from the host computer.

In this case, the mobile terminal device may be provided with a predetermined manually operable member. The mobile terminal device may be configured such that the print data is transmitted from the mobile terminal device to the printer when the predetermined manually operable member is operated.

In a particular case, the mobile terminal device may be a cell phone, and the print data may be transmitted from the cell phone to the printer by a data communication which does not use a cell phone network system.

Optionally, the print data is transmitted from the cell phone to the printer by a wireless communication.

Further optionally, the mobile terminal device may be a cell phone, and the data communication between the cell phone and the host computer may be performed using a cell phone network system.

According to another aspect of the invention, there is provided a method of printing a slip, which method is to be employed in a service management system including a host computer that stores data related to a service managed by the service management system, a mobile terminal device having that is capable of performing data communication with the host computer, and a mobile printer that is capable of receiving data from the mobile terminal device and printing an image in accordance with the data received from the mobile terminal device. The method includes the steps of displaying an input screen that allows a customer to input a service the customer desires to receive, transmitting data input by the customer referring to the input screen to the host computer, receiving print data that is generated by the host computer in accordance with the data that is input by the customer and transmitted in the step of transmitting, and transmitting the print data that was received in the step of receiving to the printer, the printer printing an image on a slip in accordance with the print data.

Optionally, the may further include a step of displaying available service items on a display of the mobile terminal device in order to allow the customer to select desired items from among the displayed ones.

Optionally, the print data generated by the host computer may have a format that corresponds to the service item selected by the customer.

In this case, the service information may include data indicating a method of payment for the service rendered.

Further, the host computer may generate different print data depending on the method of payment.

Specifically, when the payment method is to pay in cash, the host computer may generate the print data for printing a billing receipt. Further, when the payment method is to pay later, the host computer may generate the print data for printing a delivery slip and a delivery receipt.

Optionally, the service the customer wants to receive allows the customer to buy items, and the service information may include information indicating items the customer intends to buy and quantities thereof.

Still optionally, the service information may include information regarding a payment method for the items the customer intends to buy.

According to a further aspect of the invention, there is provided a computer program product for a mobile terminal device included in a service management system which includes a host computer that stores data related to a service managed by the service management system, the mobile terminal device capable of performing data communication with the host computer, and a mobile printer that is capable of receiving data from the mobile terminal device and printing an image in accordance with the data received from the mobile terminal device. The computer program product contains instructions to be executed by the mobile terminal device to cause the mobile terminal device to display an input screen that allows a customer to input a service the customer desires to receive, transmit data input by the customer referring to the input screen to the host computer, receive print data that is generated by the host computer in accordance with the data that is input by the customer and transmitted in the step of transmitting, and transmit the print data that was received in the step of receiving to the printer, the printer printing an image on a slip in accordance with the print data.

DESCRIPTION OF THE EMBODIMENT

Referring to the drawings, a mobile order receiving/placing system 1 according to an embodiment of the invention will be described.

Figure 1:
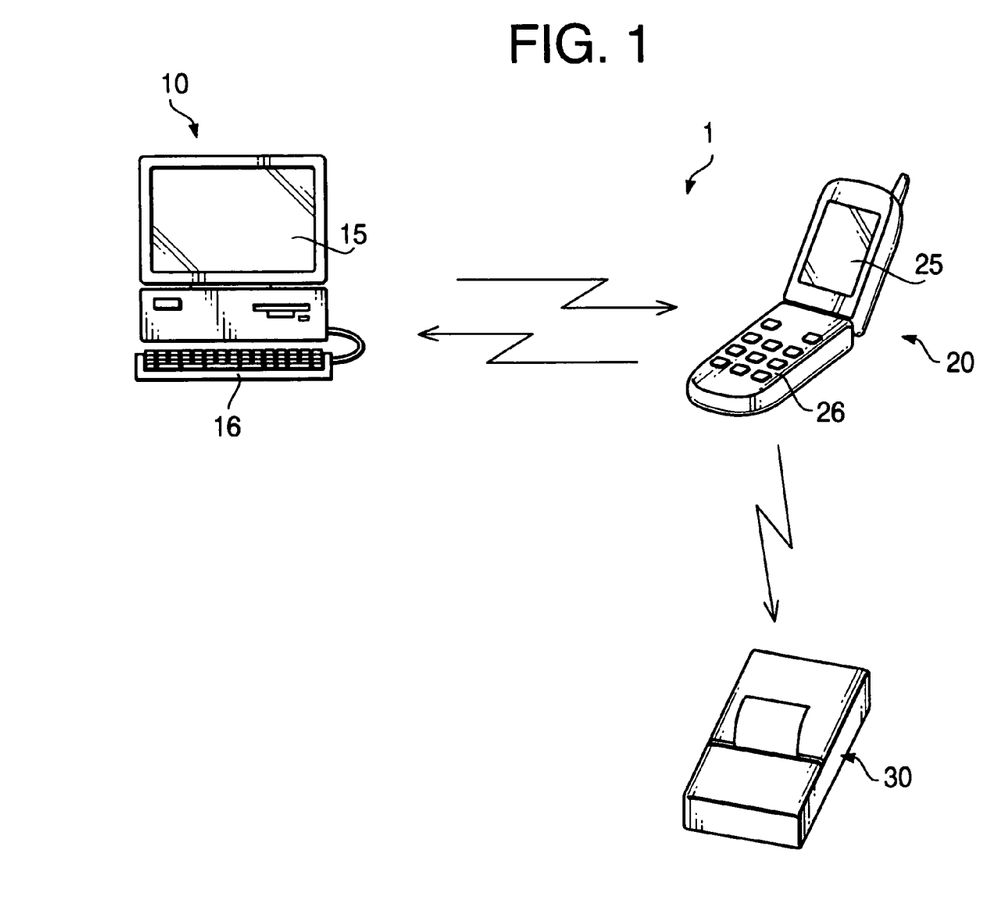
FIG. 1 shows a schematic configuration of a mobile order receiving/placing system employing a slip printing system according to an embodiment of the invention.

FIG. 1 shows a schematic configuration of the mobile order receiving/placing system (hereinafter, referred to as the mobile order system) 1 employing a slip printing system according to the invention. The mobile order system 1 as shown in FIG. 1 includes a host computer 10, a cell phone 20 and a mobile printer 30.

The host computer 10 is, for example, a general use personal computer. The host computer 10 has data base containing information of available selling items (item information) and customer information. The host computer 10 is provided with a display 15 and a keyboard 16, as shown in FIG. 1.

The cell phone 20 is provided with a display 25 and operation unit 26, which includes, for example, ten keys for punching in a phone number, a cursor key and a confirmation key. The cell phone 20 is capable of exchanging data with the host computer through a cell phone communication network. Further, the cell phone 20 is capable of performing a wireless data communication with the printer 30. The configuration for the data communication will be described later.

The printer 30 is a mobile printer, which is compact and has a built-in battery. The printer 30 is implemented with data for generating characters to be printed. Thus, only by receiving text data, which is relatively small in size, the printer 30 is capable of developing bit map image of characters represented by the text data and printing the developed image on a recording sheet (not shown) set to the printer 30.

Further, as aforementioned, the printer 30 is capable of performing the wireless data communication with the cell phone 20. The printer 30 is capable of receiving print data from the cell phone 20, and printing an image represented by the received print data.

Figure 2:
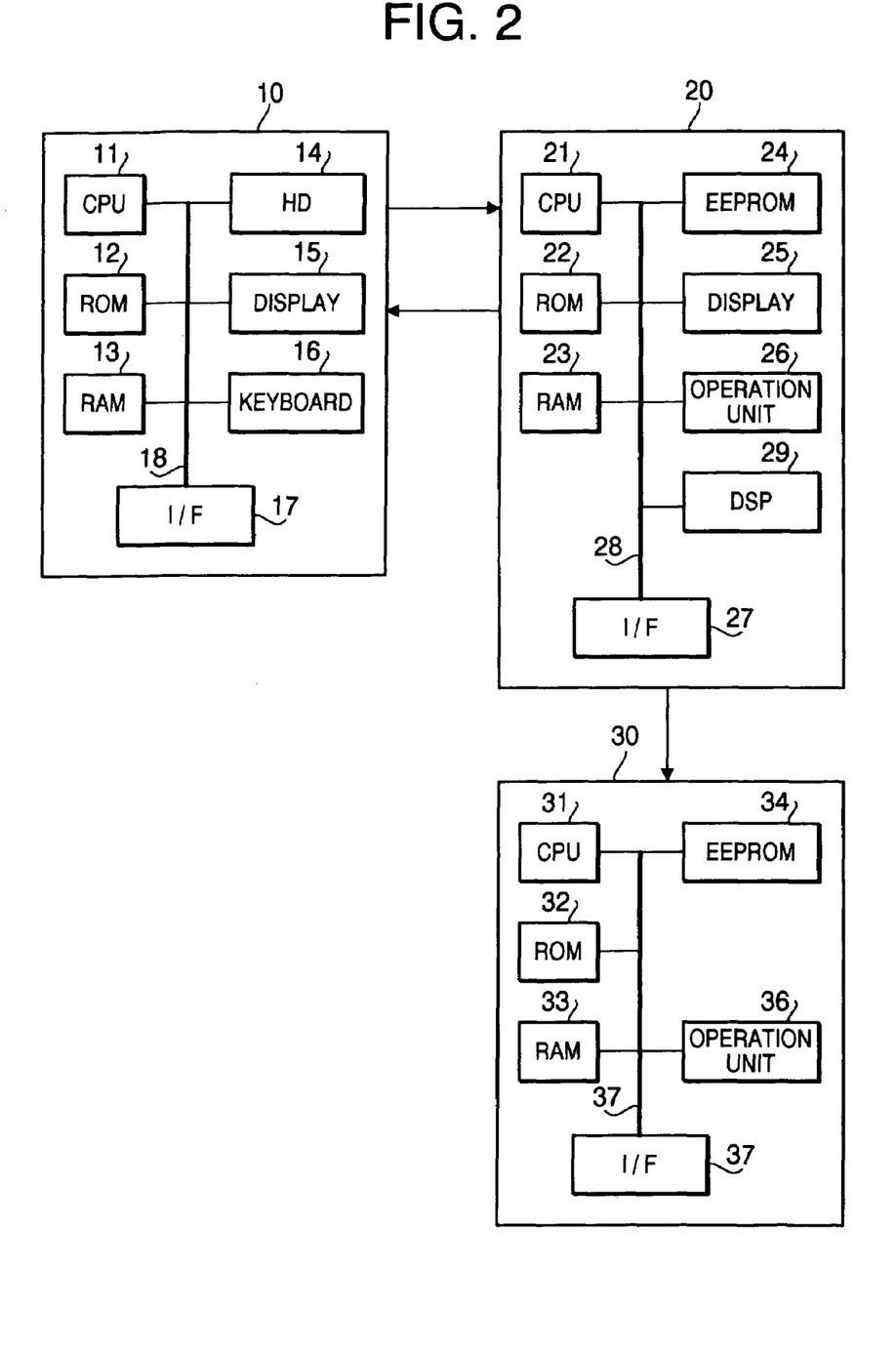
FIG. 2 is a block diagram showing a control system of the mobile order receiving/placing system shown in FIG. 1.

FIG. 2 is a block diagram showing a control system of the mobile order system 1.

The host computer 10 includes a CPU (Central Processing Unit) 11, a ROM (Read Only Memory) 12, a RAM (Random Access Memory) 13, an HD (Hard Disk Drive) 14, the display 15, the keyboard 16 and an Interface (I/F) 17, which are interconnected through a bus 18.

The CPU 11 executes various operations and procedures in accordance with signals input through the keyboard 16 and programs and data stored in the ROM 12, RAM 13 and HD 14. In particular, the ROM 12, which is a read only memory, stores various programs to be executed by the CPU 11 to control the operation of the host computer 10. Further, the RAM 13, which is a readable/writable volatile memory, temporarily stores results of operations.

The HD 14 is a readable/writable storage device. Various pieces of software including programs causing the host computer 10 to function as part of the mobile order system 1 are stored therein. The HD 14 also stores various data generated/processed by the CPU 11.

The I/F 17 enables the data communication with a wireless interface 27 of the cell phone 20.

A combination of the above-described hardware and software, functional modules 41-44 (see FIG. 4) are realized in the host computer 10, which will be described later.

The cell phone 20 includes a CPU 21, a ROM 22, a RAM 23, an EEPROM (Electrically Erasable Programmable ROM) 24, the display 25, the operation unit 26 including manually operable alpha-numerical keys and selection buttons, a DSP (Digital Signal Processor) 29 and the wireless interface 27, which are interconnected through a bus 28.

The CPU 21 executes various operations and procedures in accordance with signals input through the operation unit 26 and programs and data stored in the ROM 22 and RAM 23. In particular, the ROM 22, which is a read only memory, stores various programs to be executed by the CPU 21 to control the operation of the cell phone 20. Further, the RAM 23, which is a readable/writable volatile memory, temporarily stores results of operations.

The EEPROM 24 is a readable/writable non-volatile memory. Various pieces of software including programs causing the cell phone 20 to function as part of the mobile order system 1 are stored therein. The EEPROM 24 also stores data transmitted from the host computer 10. The wireless interface 27 enables the wireless data communication with the wireless interface 17 of the host computer 10 and a wireless interface 37 of the printer 30, which will be described later.

The DSP 29 is a processor that executes processing audio signals. Specifically, the DSP 29 is connected with a microphone and speaker (not shown) through an A/D (analog-to-digital) converter and D/A (digital-to-analog) converter (not shown), respectively.

A combination of the above-described hardware and software, functional modules 51-54 (see FIG. 4) are realized in the cell phone 20, which will be described later.

The printer 30 includes a CPU 31, a ROM 32, a RAM 33, an EEPROM 34, an operation unit 36 including manually operable buttons and the wireless interface 37, which are interconnected through a bus 38.

The CPU 31 executes various operations and procedures in accordance with signals input through the operation unit 36 and programs and data stored in the ROM 32 and RAM 33. In particular, the ROM 32, which is a read only memory, stores various programs to be executed by the CPU 31 to control the operation of the printer 30. Further, the RAM 33, which is a readable/writable volatile memory, temporarily stores results of operations.

The EEPROM 34 is a readable/writable non-volatile memory. Various pieces of software including programs causing the printer 30 to function as part of the mobile order system 1 are stored therein. The EEPROM 34 also stores data transmitted from the cell phone 20. The wireless interface 37 enables the wireless data communication with the wireless interface 27 of the cell phone 20, which will be described later.

A combination of the above-described hardware and software, functional modules 61-64 (see FIG. 4) are realized in the printer 30, which will be described later.

According to the embodiment, a well-known wireless interface can be used as each of the wireless interfaces 27 and 37. For example, as the wireless interface, a communication card for the cell phone or PHS (personnel handy phone system), a wireless LAN (Local Area Network), a Bluetooth communication card, and IrDA (Infrared Data Association) can be used. It should be noted that the data communication between the cell phone 20 and the printer 30 may be executed using a cable or a telephone network.

Figure 3:
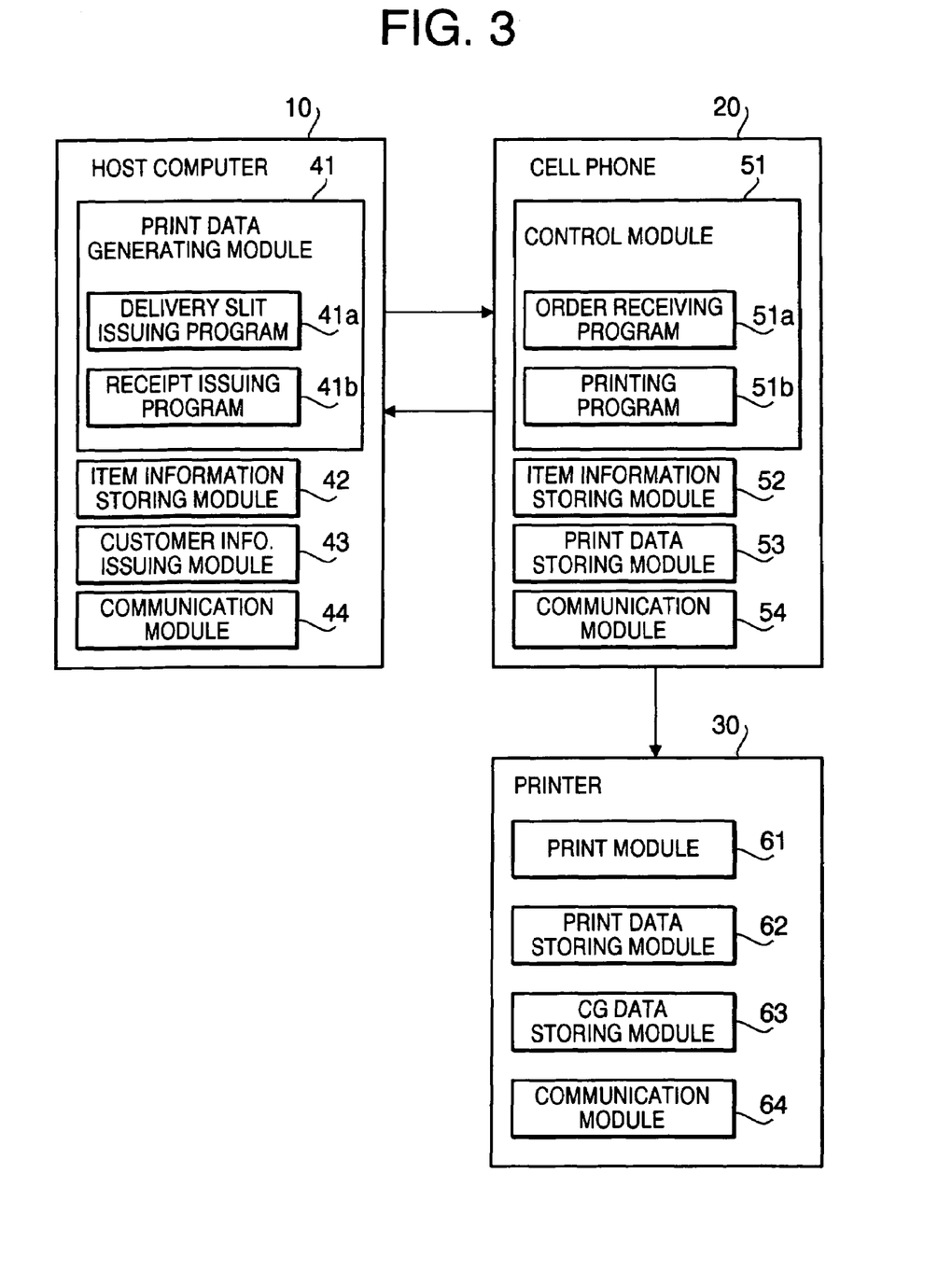
FIG. 3 is a block diagram showing a functional configuration of the mobile order receiving/placing system shown in FIG. 1.

FIG. 3 is a block diagram showing a functional configuration of the mobile order system 1.

The host computer 10 includes a print data generating module 41, item information storing module 42, customer information storing module 43 and a communication module 44.

The print data generating module 41 is implemented with known functions for generating various pieces of print data. The print data generating module 41 generates print data in accordance with signals input by and transmitted from the sales person through the operation unit 26 of the cell phone 20. According to the cell phone 20, the print data generated by the print data generating module 41 includes character codes corresponding to the characters included in order receiving/placing slips to be printed, and data regarding font and size of the characters. The print data generating module 41 includes a delivery slip issuing program 41a and a billing receipt issuing program 41b.

The delivery slip issuing program 41a is a program to be executed by the CPU 11 when a delivery slip issuing procedure is executed. The delivery slip issuing procedure is executed, for example, when items are delivered to the customer, while the charges thereof will be billed later. Specifically, in the delivery slip issuing procedure, print data of the delivery slip (or a temporary bill) and the delivery receipt is generated.

The billing receipt issuing program 41b is a program to be executed by the CPU 11 when a billing receipt procedure is executed. The billing receipt issuing procedure is executed when the items are delivered, and payment is finished when the items are given to the customer. In the billing receipt issuing procedure, the print data of the billing receipt to be handed to the customer is printed.

The item information storing module 42 stores a data base containing information regarding available items (i.e., items which can be sold). The item information includes, for example, types of items, stock status and unit price of each item.

The item information stored in the item information storing module 42 is updated based on ordering data transmitted from the cell phone 20. The ordering data includes identification data for identifying respective items and the quantity of ordered items. Therefore, in the item information storing module 42, the latest item information is stored always.

The customer information storing module 43 stores a data base containing information regarding registered customers. The customer information includes, for example, name, address and phone number of each custom, and purchase history: types, quantities of items purchased by each customer; and dates when respective items were purchased.

The customer information stored in the customer information storing module 43 is updated based on the ordering information transmitted from the cell phone 20. The ordering data includes, as described above, identification data for identifying respective items and the quantity of ordered items. Therefore, in the item customer information storing module 43, the latest customer information is stored always.

The communication module 44 receives the ordering information from the cell phone 20. The communication module 44 transmits the item information (e.g., stock status, unit price) stored in the item information storing module 42 to the cell phone 20. Further, the communication module 44 transmits print data of the delivery slip and delivery receipt or the billing receipt generated by the delivery slip issuing program 41a or the print data of the billing receipt generated by the billing receipt issuing program 41b to the cell phone 20.

The cell phone 20 includes a control module 51, an item information storing module 52, a print data storing module 53 and a communication module 54.

The control module 51 controls the display 25 to display various images for the item ordering system 1. Further, the control module 51 transmits data to the host computer 10 and the printer 30 in accordance with the signals input by the sales person. It should be noted that, in FIG. 5, the order receiving program 51a and the printing program 51b are stored.

By executing the order receiving program 51a, the control module 51 controls the display 25 to display an item information confirming image used for the user (and sales person) to confirm the stock status and unit price of the items, and an item selection image (item input image) allowing the user to select and order the items.

By executing the printing program 51b, a print preview image for allowing the sales person to confirm the print data transmitted from the host computer 10 is displayed on the display 25. Further, by executing the printing program 51b, a print start command is transmitted to the printer 30 so that the printer 30 starts printing the order receiving/placing slip. It should be noted that printing program 51b is configured such that the print preview image is optionally displayed, and is normally omitted. Alternatively, the step of displaying the print preview image may be omitted.

The items information storing module 52 stores the item information transmitted from the host computer 10. The item information stored in the item information storing module 52 is updated based on the information transmitted from the host computer 10. That is, when the item information stored in the item information storing module 42 of the host computer 10 is updated, the updated information is transmitted to the cell phone 20. Therefore, the item information storing module 52 always stores the latest item information.

The print data storing module 53 stores the print data transmitted from the host computer 10. The communication module 54 functions to transmit the order receiving/placing information of each items input to the cell phone to the host computer 10, and to receive the item information including the stock status and unit price, and the print data from the host computer 10. The communication module 54 transmits the print data transmitted from the host computer 10 to the printer 30.

The printer 30 includes the print module 61, the print data storing module 62, the CG (character generator) data storing module 63 and the communication module 64.

The print module 61 executes a printing operation when the print start command is received, in accordance with the print data stored in the print data storing module 62. The print start command is transmitted from the cell phone 20 when the sales person operates the operation unit 26 of the cell phone 20, or input when the sales person directly operates the operation unit 36 of the printer 30.

The print data storing module 62 stores the print data transmitted from the cell phone 20. Therefore, once the print data has been transmitted from the cell phone 20 and stored in the print data storing module 62, there will be no need for the cell phone 20 to transmit the print data to the printer 30. Only by transmitting the print start command, the printer 30 prints the data again, without receiving the print data again from the cell phone 20.

The CG data storing module 63 stores character data representing shapes of a lot of characters, and text codes with a relationship therebetween. Because of this configuration, it is unnecessary fro the printer 30 to receive large-sized data including a bit map image of each characters on the order receiving/placing data. That is, only by receiving text data including codes of the characters to be printed on the order receiving/placing slip, the order receiving/placing slip can be printed. The printing module 61 thus executes the printing operation referring to the character codes stored in the print data storing module 62 and the CG data storing module 63.

The communication module 64 receives the print data and the print start command, which are transmitted by the cell phone 20.

Next, with reference to flowing charts, a procedure of receiving/placing an order will be described.

Figure 4A:
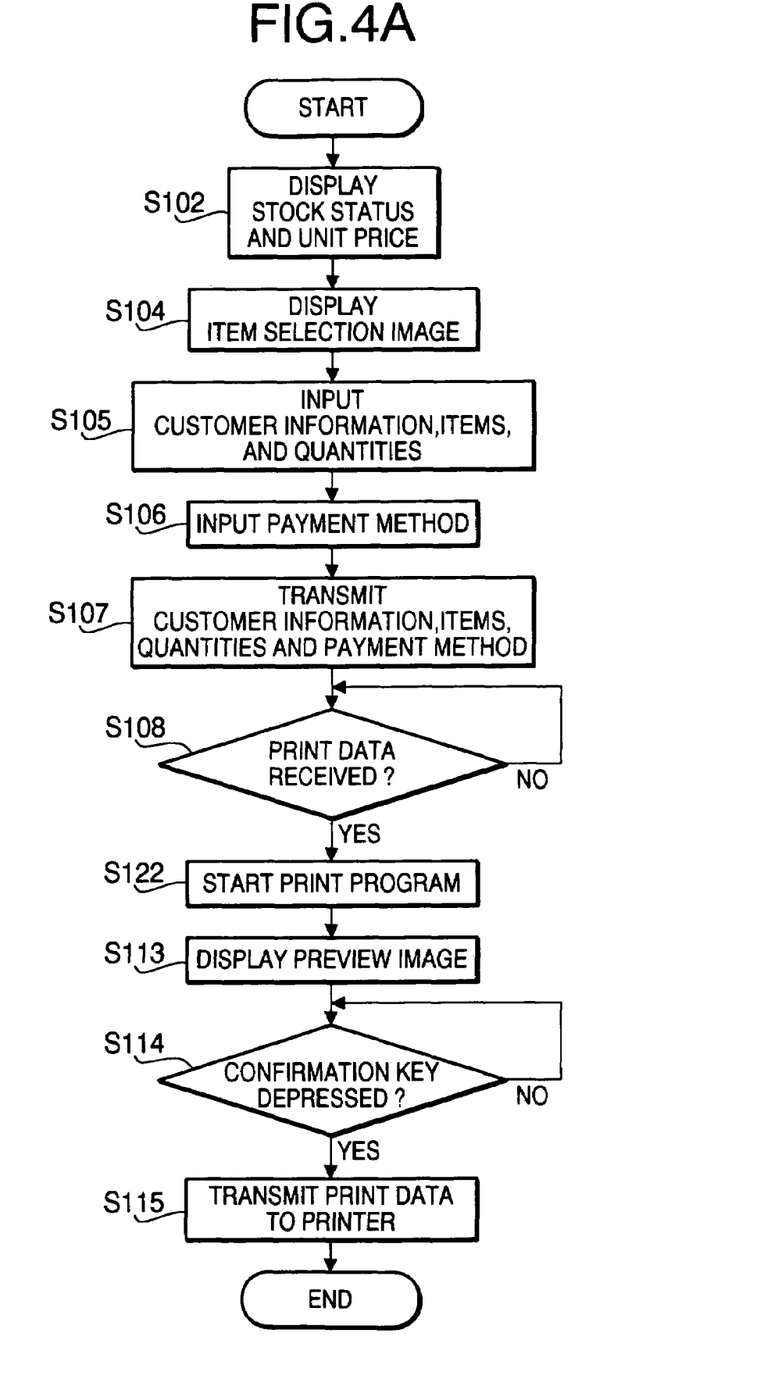
FIG. 4A is a flowchart illustrating an order reception procedure executed in a cell phone.
Figure 4B:
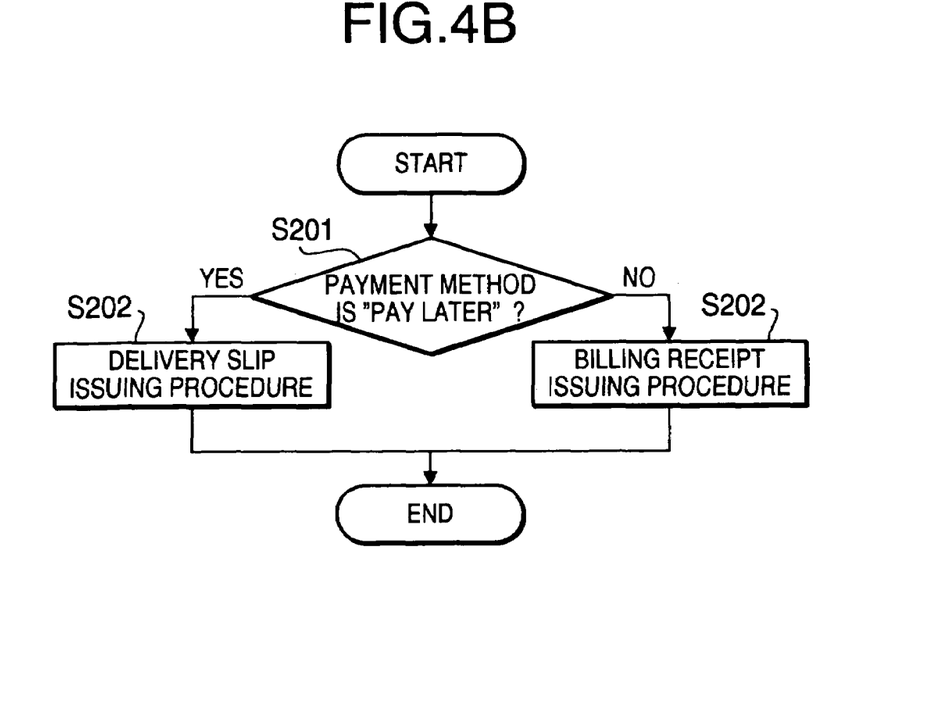
FIG. 4B is a flowchart illustrating a print data generating procedure executed in a host computer.
Figure 4C:
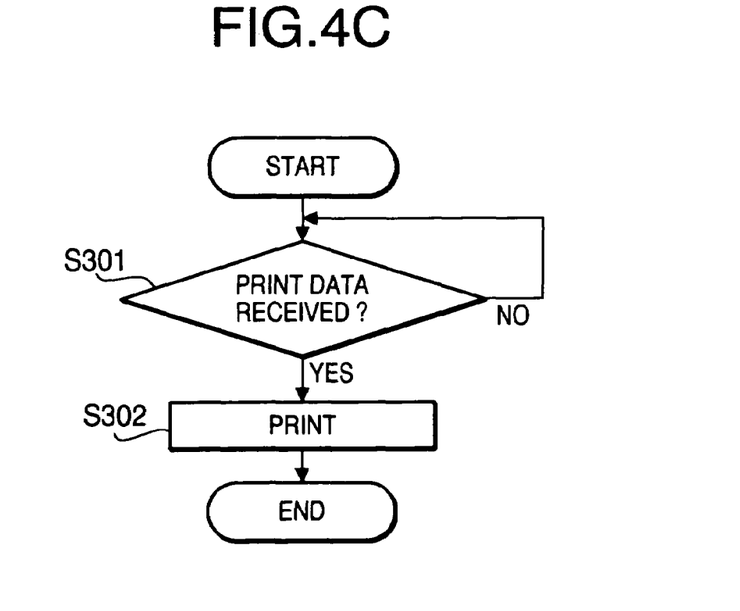
FIG. 4C is a printing procedure executed by a printer.

FIG. 4A is a flowchart illustrating an order reception procedure executed in the cell phone 20, FIG. 4B is a flowchart illustrating a print data generating procedure executed in the host computer 10, and FIG. 4C is a printing procedure executed by the printer 30.

The order reception procedure starts when the sales person operates the operation unit 26 of the cell phone 20 so that the order receiving program of the control module 51 is started.

In S102, the control module 51 displays the item information confirming image on the display 25. The sales person observes the thus displayed image to check the stock status and unit prices if each item, and inform the same of the customer. As described above, the latest item information is stored in the item information storing module 52. Accordingly, in S102, the sales person operates the operation unit 26 to display the information confirming image on the display 25 based on the information stored in the item information storing module 52.

The customer determines the items to buy with viewing the information confirming image displayed on the display 25 of the cell phone 20. When the customer determines the items to buy, the sales person operates the operation unit 26 to display the item selection image for selecting items and inputting the number thereof on the display 25 (S104).

In accordance with the customer's request, the sales person operates the cursor key of the cell phone 20 to move the cursor (not shown) on the item selection image, and input necessary information including the items the customer intends to buy, the customer information (e.g., a customer ID number), and the number of the items, using ten keys for dialing (S105).

Figure 5A:
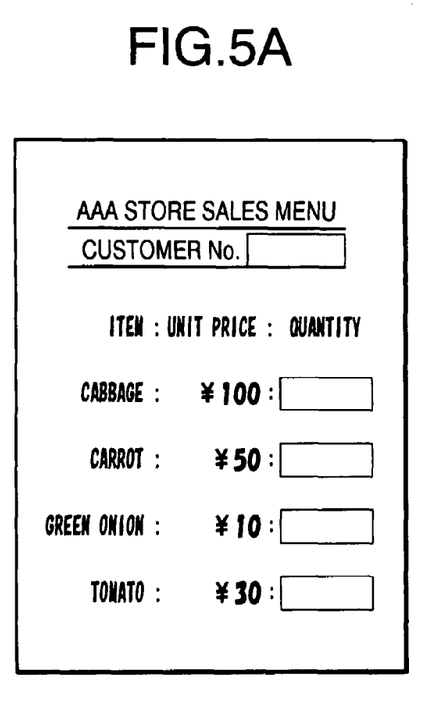
FIG. 5A shows an example of an item selection screen before ordering data is input.
Figure 5B:
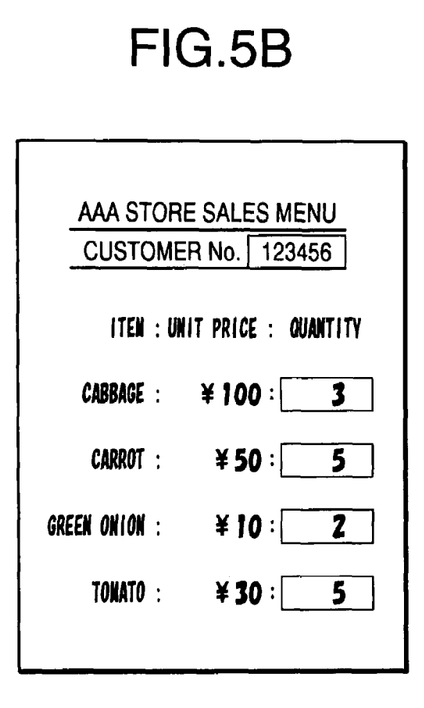
FIG. 5B shows the item selection screen after the ordering data has been input.

FIG. 5A shows an example of the item selection image before ordering data is input, and FIG. 5B shows the item selection screen after the ordering data has been input.

In FIG. 5A, four kinds of vegetables the customer intends to buy are listed with their unit prices. FIG. 5B shows the same image with the customer ID number "123456" and the number of each item has been input.

Although not shown in the item selection image, the customer can choose a method of payment (e.g., pay promptly in cash or pay later). Then, the sales person operates the operation unit 26 to input the necessary information including the method of payment (S106).

When the necessary information has been input, the sales person operates the operation unit 26 to connect the cell phone 20 to the host computer 10 through the telephone network, and transmits the ordering information including the customer information, items to buy and numbers thereof and the method of payment to the host computer 10 (S107).

The host computer 10 processes the ordering information and generates the print data, which is transmitted to the cell phone 20. It should be noted that, when the ordering information transmitted from the cell phone in S107 is received by the host computer 10, it is regarded that the order is placed.

In S108, the control module 51 checks whether the print data is transmitted from the host computer 10. Until the print data is received (S108: NO), control repeats S108. When the print data is received (S108: YES), control proceeds to S112.

When the cell phone 20 receives the print data generated by the host computer 10, control module 51 starts the print program in S112. Then, in response to the operation of the sales person, the control module 51 controls the operation unit 26 to display the preview image of the slip to be printed (S113).

Figure 5C:
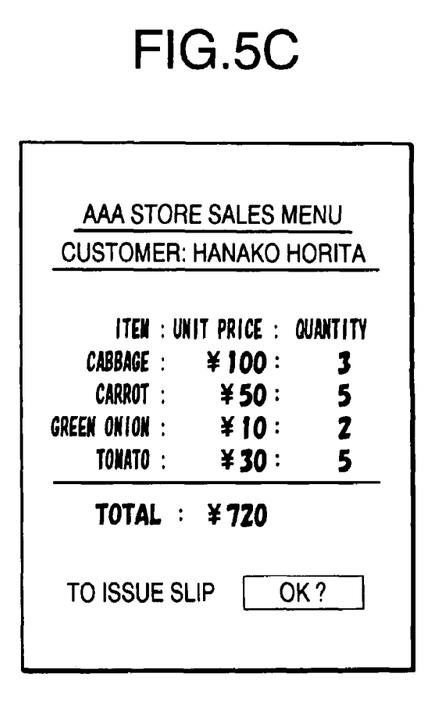
FIG. 5C shows an example of a print preview screen.

FIG. 5C shows an example of the print preview screen corresponding to the ordering information input in the item selection image shown in FIG. 5B. In the preview image, the customer number input in the item selection image has been changed to the name of the customer based on the customer information stored in the customer information storing module 43 of the host computer 10. Further, in the preview image, the names of the items the customer intends to buy, the unit prices of the items, the number of each item are displayed, and further, the sum of the prices are indicated.

Further, the preview image includes a confirmation key which is operated to issue the order receiving/placing slip after the sales person confirm the contents of the print data.

The sales person confirms the contents of the print data displayed as the preview image, and then moves the cursor to the confirmation key using the cursor key of the cell phone 20 and press the confirmation key with the cell phone 20 and the printer 30 being arranged to communicate with each other (S114).

Figure 6A:
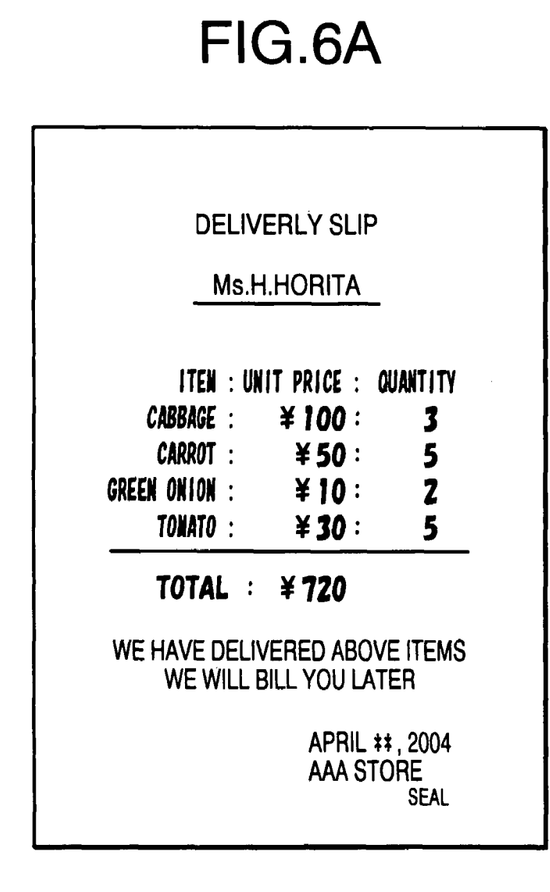
FIG. 6A shows an example of a delivery slip printed by the printer.
Figure 6B:
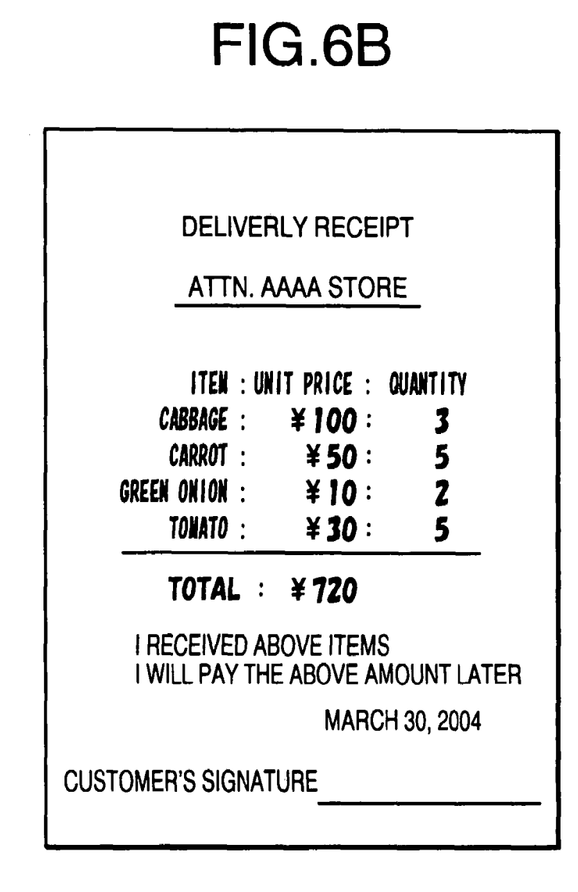
FIG. 6B shows an example of a delivery receipt printed by the printer.
Figure 7:
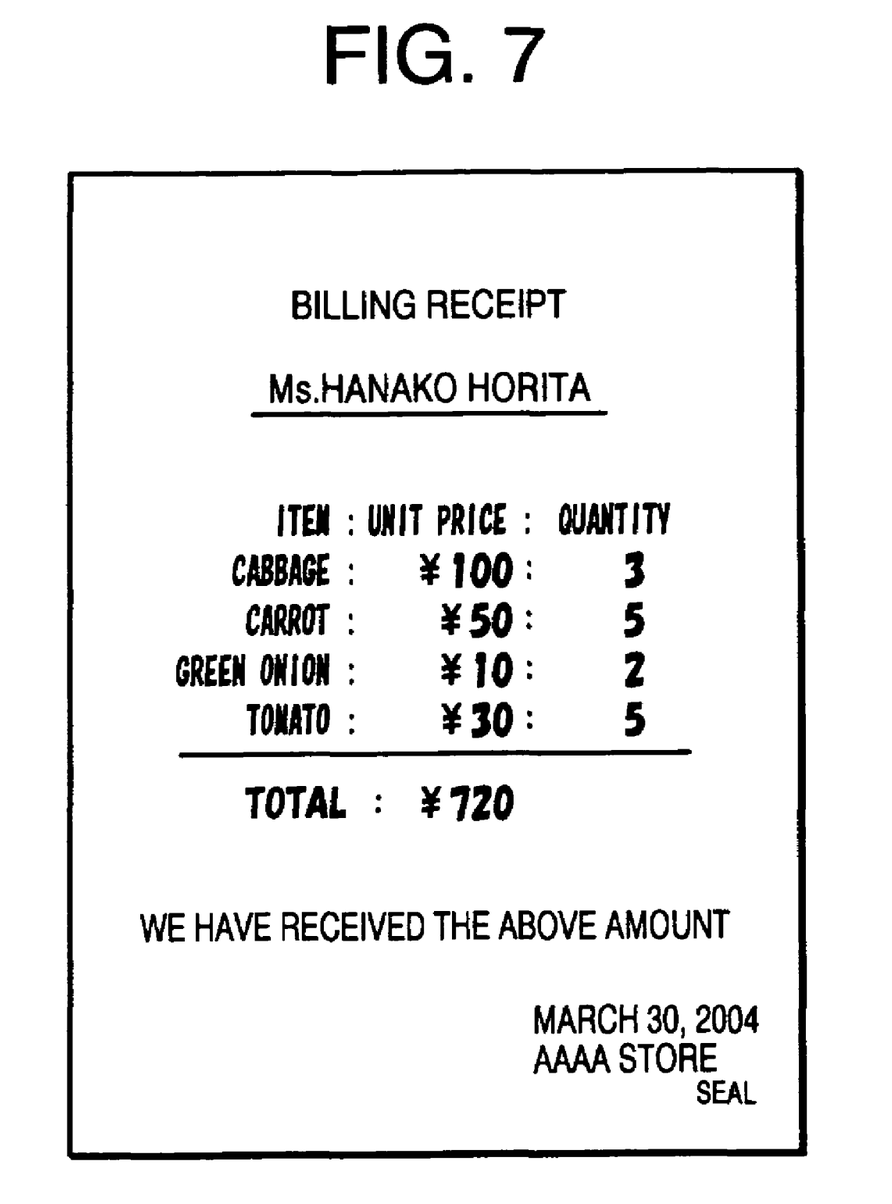
FIG. 7 shows an example of a payment receipt printed by the printer.

Then, the contents displayed as the preview image is transmitted from the cell phone 20 to the printer 30 (S115). The printer 30, when the print data and print start command are received, generates a print image having a predetermined format in the printer 30, and executes the printing operation. FIGS. 6A and 6B show examples of delivery slip and delivery receipt as printed. FIG. 7 shows an example of the billing receipt. If the payment method of the bought items is the later payment, the sales person hands the ordered items with the signed delivery slip, and receives a delivery receipt signed by the customer. If the payment method of the ordered items is the payment in cash, the sales person hands the ordered items, receives the payment of the items, and hands the signed billing receipt.

Next, the print data generating procedure executed in the host computer 10 will described with reference to FIG. 4B.

The print data generating procedure is executed when the ordering information is transmitted from the cell phone 20 (see S107 of FIG. 4A).

In S201, the print data generating module 41 determines whether the payment method is the "pay in cash" or "pay later." When the payment method is "pay later" (S201: YES), control proceeds to S202. In this case, the delivery slip issuing procedure is executed to generate print data of the delivery slip and the delivery receipt. Simultaneously with generation of the print data in S202, the customer information stored in the customer information storing module 43 is updated with delivered status of the ordered items.

When the payment method is "pay in cash" (S201: NO), control proceeds to S203. In this case, since the customer pays for the ordered items, the billing receipt issuing procedure is executed to generate the print data of the billing receipt (S203). In this case, the customer information stored in the customer information storing module 43 is updated by registering data indicative of the quantities of the items sold by the customer.

After S202 or S203 is executed, the print data as generated is transmitted to the cell phone 20, which is received in S111 of FIG. 4A.

FIG. 4C is the printing procedure, which is executed by the printer 30 when, for example, the printer 30 is powered on. In S301, the communication module 64 monitors whether the print data is received. When the print data is received (S301: YES), the print data storing module 62 stores the received data (S302). Based on the stored data and the CG data stored in the CG data storing module 63, a bit map image to be printed on the slip is generated and the bit map image is printed on the slip under control of the printing module 61 (S303).

As described above, according to the slip printing system described above, when the sales person sells the items, the sales person inputs the order information about the items, which information is sent to the host computer 10. Then, the host computer 10 generates the print data of the order receiving/placing slip and transmits the same to the cell phone 20. Then, the order receiving/placing slip is printed by the printer 30 according to the print data transmitted from the cell phone 20. Therefore, at the host computer 10, the sales status can be recognized in real time without the loss of time for a collective process.

Furthermore, the sales person is required to input only one input operation, when the item selection image is displayed on the display 25, for selecting the items the customer intends to buy, and inputting the number of each item. Then, the order receiving/placing slip is automatically issued, and the selling status of the items is updated. Therefore, the sales person will not be required to perform calculation for generating the order receiving/placing slip. Further, the sales person will not be required to input data for the host computer 10 after returned from outside. As a result, load to the salesperson is decreased, and business efficiency is improved. In addition, since the number times of data input is decreased, the probability of human errors is decreased. Furthermore, the sales person is required to bring only relatively lightweight devices (i.e., the cell phone 20 and the printer 30), which is much easier for the sales person to carry. Further, because of the simple mobile devices, the total cost of the system can be saved.

Additionally, since the stock status and the unit cost of each item is stored in the item information storing module 42 of the host computer 10, the sales person can receives the latest information from the host computer, and inform the customer of the price and delivery date of the desired item immediately.

Additionally, the stock status and the unit cost of each item stored in the item information storing module 42 is also stored in the item information storing module 52 of the cell phone 20. Accordingly, the sales person can inform the customer of the stock status and unit price of the item without communicating with the host computer 10.

Furthermore, the stock status and the unit cost of each item stored in the item information storing module 52 of the cell phone 20 are updated in accordance with the information transmitted from the host computer 10. Accordingly, the sales person can inform the customer of the latest information (i.e., the stock status and the unit cost).

Furthermore, since customer information is stored in the customer information storing module 43 of the host computer 10, the salesperson can provide an appropriate service to each customer, according to the customer identification number transmitted from the cell phone 20 to the host computer 10.

In the embodiment, as the payment method, "pay later" or "pay in cash" can be selected. By transmitting the information regarding the payment method the customer intends to use to the host computer 10, whichever method is selected, the sales person can handle the payment appropriately. It is convenient for the customers since selectable options for payment method are increased.

The print data generating module 41 of the host computer 10 generates print data of the delivery slip and the delivery receipt when the customer selects to pay later, and generates the print data of the billing receipt when the customer selects to pay in cash. That is, appropriate order receiving/placing slip corresponding to the payment method the customer desires is printed.

According to the embodiment, the customer information stored in the customer information storing module 43 of the host computer 10 is updated based on the ordering information including the identification information of the items and the number of respective items the customer desires to buy, which is transmitted from the cell phone 20. Accordingly, the purchase history of the customers can be obtained at the host computer 10.

Since the print data can be displayed on the display 25 of the cell phone 20 before the print data, which is transmitted from the computer 10 to the cell phone 20, is transmitted to the printer 30 for review. With this display, the sales person and/or the customer can confirm the contents of the order receiving/placing slip before it is printed, thereby waste of recording sheet can be prevented.

Additionally, since the printer 30 can communicates with the cell phone 20 directly, without the telephone network, the communication fee can be saved. In particular, according to the embodiment, the wireless data communication is carried out between the printer 30 and the cell phone 20. Accordingly, the sales person need to bring a communication cable with him/her.

As described above, the invention has been described with reference to the exemplary embodiment. It should be noted that the invention need not be limited to the above-described exemplary embodiment, and various modifications can be available within the scope of the invention, which is defined in each claim. For example, although the stock status and unit price of each item are stored both in the host computer 10 and in the cell phone 20, the information is not necessarily stored in both of them. That is, the information may be stored only in the host computer 10, for example.

Furthermore, in the above described embodiment, the stock status and unit price of each item stored in the item information storing module 52 of the cell phone 20 are rewritten in accordance with the information transmitted from the host computer 10.

It should be noted that such information may not be updated based on the information transmitted from the host computer 10. That is, when the item information stored in the information storing module 52 of the cell phone 20 is not updated, it may be convenient if the sales person receives the latest item information stored in the item information storing module 42 from the host computer 10 before the display, and the item information confirmation image is displayed based on the latest item information.

In the above described embodiment, as the payment method, "pay later" or "pay in cash" is selectable. Alternatively, the payment procedure may be limited to a predetermined one. Further alternatively, the payment method may be selected from among three or more methods. Still alternatively, even when the payment method is selected from two methods, they need not be limited to "pay later" and "pay in cash". Optionally, the print formats of the delivery slip, the delivery receipt and the billing receipt need not be limited to those shown in the FIGS. 6A-6C and 7. Articles and layout of the forms may be modified to desired ones.

In the above described embodiment, the customer information stored in the customer information storing module 43 of the host computer 10 is updated in accordance with the ordering information including the identification information and the desired quantities of the ordered items transmitted from the cell phone 20. However, the customer information is not necessarily updated based on the ordering information transmitted from the cell phone 20.

In the above described embodiment, the print data transmitted from the host computer 10 to the cell phone 20 is displayed on the display 25 of the cell phone 20 before it is transferred to the printer 30. However, the print data is not necessarily displayed on the display monitor 25 of the cell phone 20.

In the above described embodiment, the delivery slip and the delivery receipt, or the billing receipt are printed by the printer 30 as the order receiving/placing slip. It should be noted that such documents are only examples, and various types order receiving/placing slips such as an estimate sheet, an order sheet and a delivery planning sheet. Further, other mobile communication terminal device such as a PDA (Personal Digital Assistant) or a pocket computer can be used instead of the cell phone 20.

In the above described embodiment, a case where perishable foods such as vegetables are sold by the sales person is described. The invention need not be limited to such a configuration. Similar effects can be obtained in a case where various types of the items such as stocks, real estates, insurances, automobiles, gold or kerosene are sold.

In the embodiments, a case where some articles are sold is described. The invention need not be limited to such a case. That is, a case where a "service" is sold, the invention is also applicable.

According to the embodiment, when the sales person receives an order form a customer, he/she inputs the information to a mobile communication terminal device. Then, the information about the items ordered by the customer is transmitted to the host computer. The host computer generates print data of the order receiving/placing slip in response to receipt of the information from the mobile communication terminal device, and then transmits the thus generated print data to the mobile communication terminal device. The sales person then transfers the print data received from the host computer to a printer.

With this configuration, it becomes possible to recognize a real-time status of selling items at the host computer. Further, loss of time in a data collective process, which is required in the conventional system, can be omitted.

Furthermore, the sales person is required to select each item and input the quantity thereof only once, and the order receiving/placing slip and the sum of the prices and quantities of the sold items are finished. Therefore, the sales person need not perform calculation for issuing the order receiving/placing slip is not required for the salesperson, and thus troublesome work of inputting data to the host computer can be omitted. As a result, the work of the salesperson can be decreased, and work efficiency is increased. In addition, since the number of inputting operations for inputting data to the mobile communication device by the salesperson is decreased, and the probability of a human mistake can be decreased. Furthermore, only relatively lightweight devices such as the mobile communication terminal device and the mobile printer are required for the salesperson to carry, and the total cost of the system can be saved.

The present disclosure relates to the subject matter contained in Japanese Patent Application No. 2003-89778, filed on Mar. 28, 2003, which is expressly incorporated herein by reference in its entirety.

What is claimed is:

1. A slip printing system which can be employed in a service management system, comprising:
   a host computer that stores data related to a service managed by the service management system;
   a mobile terminal device that is capable of performing data communication with the host computer; and
   a mobile printer that is capable of receiving data from the mobile terminal device and printing an image in accordance with the data received from the mobile terminal device, wherein:
   the mobile terminal device includes a service information input module through which service information regarding a service a customer intends to receive and a customer-chosen method of payment for the service rendered is input, the service information input through the service information input module being transmitted from the mobile terminal device to the host computer,
   the host computer includes a print data generating module that generates print data to be printed by the printer in accordance with the service information transmitted from the mobile terminal device, the print data generated by the print data generating module being transmitted to the mobile terminal device,
   the mobile terminal device transmits the print data which has been transmitted from the host computer, and
   wherein the mobile printer prints an image on a slip in accordance with the print data transmitted from the mobile terminal device, and
   the mobile terminal device includes a display on which a preview image is displayed based on the print data transmitted from the host computer.

2. The slip printing system according to claim 1, wherein the service the customer wants to receive allows the customer to buy items, and
   wherein the service information includes information indicating items the customer intends to buy and quantities thereof.

3. The slip printing system according to claim 2, wherein the mobile terminal device includes a display, available items being displayed on the display in order to allow the customer to select desired items from among the displayed ones.

4. The slip printing system according to claim 2, wherein the service information includes information regarding a payment method for the items the customer intends to buy.

5. The slip printing system according to claim 2, wherein the host computer stores stock status of available items and unit prices thereof.

6. The slip printing system according to claim 5, wherein at least part of the stock status of available items and unit prices thereof are stored in the mobile terminal device.

7. The slip printing system according to claim 6, wherein at least part of the stock status of available items and unit prices thereof stored in the mobile terminal device are updated in accordance with data transmitted from the host computer.

8. The slip printing system according to claim 1,
   wherein the service information transmitted from the mobile terminal device to the host computer includes customer identification data, and
   wherein the print data generating module inserts a customer's name in the print data, the customer's name being retrieved based on the customer identification data transmitted.

9. The slip printing system according to claim 8, wherein the host computer stores customer information, which is updated based on the service information transmitted from the mobile terminal device.

10. The slip printing system according to claim 1, wherein the print data generating module generates different print data depending on the method of payment.

11. The slip printing system according to claim 10, wherein when the payment method is to pay in cash, the print data generating module generates the print data for printing a billing receipt.

12. The slip printing system according to claim 10, wherein when the payment method is to pay later, the print data generating module generates the print data for printing a delivery slip and a delivery receipt;
   wherein the service the customer wants to receive allows the customer to buy items; and
   wherein the service information includes information indicating items the customer intends to buy and quantities thereof.

13. The slip printing system according to claim 1, wherein the host computer stores customer information, which is updated based on the service information transmitted from the mobile terminal device.

14. The slip printing system according to claim 1, wherein the mobile terminal device includes a display, available service items which can be selected by a customer being displayed on the display in order to allow the customer to select desired service items from among the displayed ones.

15. The slip printing system according to claim 1, wherein the print data generating module generates the print data having a format that corresponds to the service item selected by the customer.

16. The slip printing system according to claim 1, wherein the print data represents a slip regarding a payment for the service item selected by the customer.

17. The slip printing system according to claim 1,
   wherein the mobile terminal device is provided with a predetermined manually operable member, and
   wherein the print data is transmitted from the mobile terminal device to the printer when the predetermined manually operable member is operated.

18. The slip printing system according to claim 1, wherein the mobile terminal device is a cell phone, the print data being transmitted from the cell phone to the printer by a data communication which does not use a cell phone network system.

19. The slip printing system according to claim 18, the print data is transmitted from the cell phone to the printer by a wireless communication.

20. The slip printing system according to claim 1, wherein the mobile terminal device is a cell phone, the data communication between the cell phone and the host computer being performed using a cell phone network system.

21. A method of printing a slip to be employed in a service management system which includes a host computer that stores data related to a service managed by the service management system, a mobile terminal device that is capable of performing data communication with the host computer, and a mobile printer that is capable of receiving data from the mobile terminal device and printing an image in accordance with the data received from the mobile terminal device, the method comprising the steps of:

displaying an input screen that allows a customer to input service information regarding a service the customer desires to receive and a customer-chosen method of payment for the service;

transmitting data input by the customer referring to the input screen to the host computer;

receiving print data that is generated by the host computer in accordance with the data that is input by the customer and transmitted in the step of transmitting;

displaying a preview image on a display based on the print data received in the step of receiving; and     transmitting the print data that was received in the step of receiving to the printer, the printer printing an image on a slip in accordance with the print data.

22. The method according to claim 21, further comprising a step of displaying available service items on a display of the mobile terminal device in order to allow the customer to select desired items from among the displayed ones.

23. The method according to claim 21, wherein the print data generated by the host computer has a format that corresponds to the service item selected by the customer.

24. The method according to claim 21, wherein the host computer generates different print data depending on the method of payment.

25. The method according to claim 24, wherein when the payment method is to pay in cash, the host computer generates the print data for printing a billing receipt.

26. The method according to claim 24, wherein when the payment method is to pay later, the host computer generates the print data for printing a delivery slip and a delivery receipt.

27. The method according to claim 21, wherein the service the customer wants to receive allows the customer to buy items, and     wherein the service information includes information indicating items the customer intends to buy and quantities thereof.

28. The method according to claim 27, wherein the service information includes information regarding a payment method for the items the customer intends to buy.

29. A computer-readable medium storing a computer program product for a mobile terminal device included in a service management system which includes a host computer that stores data related to a service managed by the service management system, the mobile terminal device capable of performing data communication with the host computer, and a mobile printer that is capable of receiving data from the mobile terminal device and printing an image in accordance with the data received from the mobile terminal device, the computer program product contains instructions to cause the mobile terminal device to:

display an input screen that allows a customer to input service information regarding a service the customer desires to receive and a customer-chosen method of payment for the service;

transmit data input by the customer referring to the input screen to the host computer;

receive print data that is generated by the host computer in accordance with the data that is input by the customer and transmitted in the step of transmitting;

display a preview image on a display based on the print data received in the step of receiving; and     transmit the print data that was received in the step of receiving to the printer, the printer printing an image on a slip in accordance with the print data.

* * * * *